United States Patent [19]

Sorenson et al.

[11] Patent Number: 5,259,518
[45] Date of Patent: Nov. 9, 1993

[54] MERCHANDISING SYSTEM

[75] Inventors: Gerald R. Sorenson, Elgin; Joseph A. Brhel, Des Plaines; William R. Novak, Lake Zurich, all of Ill.

[73] Assignee: NCM International, Inc., Arlington Heights, Ill.

[21] Appl. No.: 17,338

[22] Filed: Feb. 11, 1993

Related U.S. Application Data

[63] Continuation of Ser. No. 742,915, Aug. 9, 1991, abandoned.

[51] Int. Cl.$^5$ .................................................. A47F 1/04
[52] U.S. Cl. ...................................... 211/59.2; 211/151
[58] Field of Search ............... 211/59.2, 151, 175, 211/187, 191; 193/35 R, 35 J, 37

[56] References Cited

U.S. PATENT DOCUMENTS

| | | | |
|---|---|---|---|
| 2,740,513 | 4/1956 | Sullivan | 193/35 R |
| 2,983,352 | 5/1961 | De Flora et al. | 193/35 R |
| 3,269,557 | 8/1966 | Wahl | 211/151 |
| 3,642,339 | 2/1972 | Ruderfer | 211/151 X |
| 3,900,112 | 8/1975 | Azzi et al. | 211/59.2 X |
| 4,054,195 | 10/1977 | Wahl | 193/35 R |
| 4,372,451 | 2/1983 | Rasmussen et al. | 211/151 X |
| 4,383,614 | 5/1983 | Miller | 211/59.2 |
| 4,394,910 | 7/1983 | Miller | 211/151 X |
| 4,765,493 | 8/1988 | Kinney | 211/59.2 |
| 5,078,250 | 1/1992 | Cole | 193/35 R |

*Primary Examiner*—David M. Purol
*Attorney, Agent, or Firm*—Wallenstein, Wagner & Hattis, Ltd.

[57] ABSTRACT

A system for merchandising a plurality of discrete products is disclosed. The system comprises a frame comprising a front and rear support assembly, a front cross-member and a rear cross-member. An outer pair of spaced, inwardly tapered, parallel roller tracks extend between the front cross-member and the rear cross member. A plurality of bi-directionally tapering roller tracks are disposed in parallel between the outer pair of roller tracks and extend between the front cross-member and the rear cross-member. Each of the roller tracks cooperate with an adjacent one of the roller tracks to form a generally V-shaped guide for sequentially delivering product. The bi-directionally tapering roller tracks are laterally adjustable to selectably adjust the width of each of the guides.

24 Claims, 4 Drawing Sheets

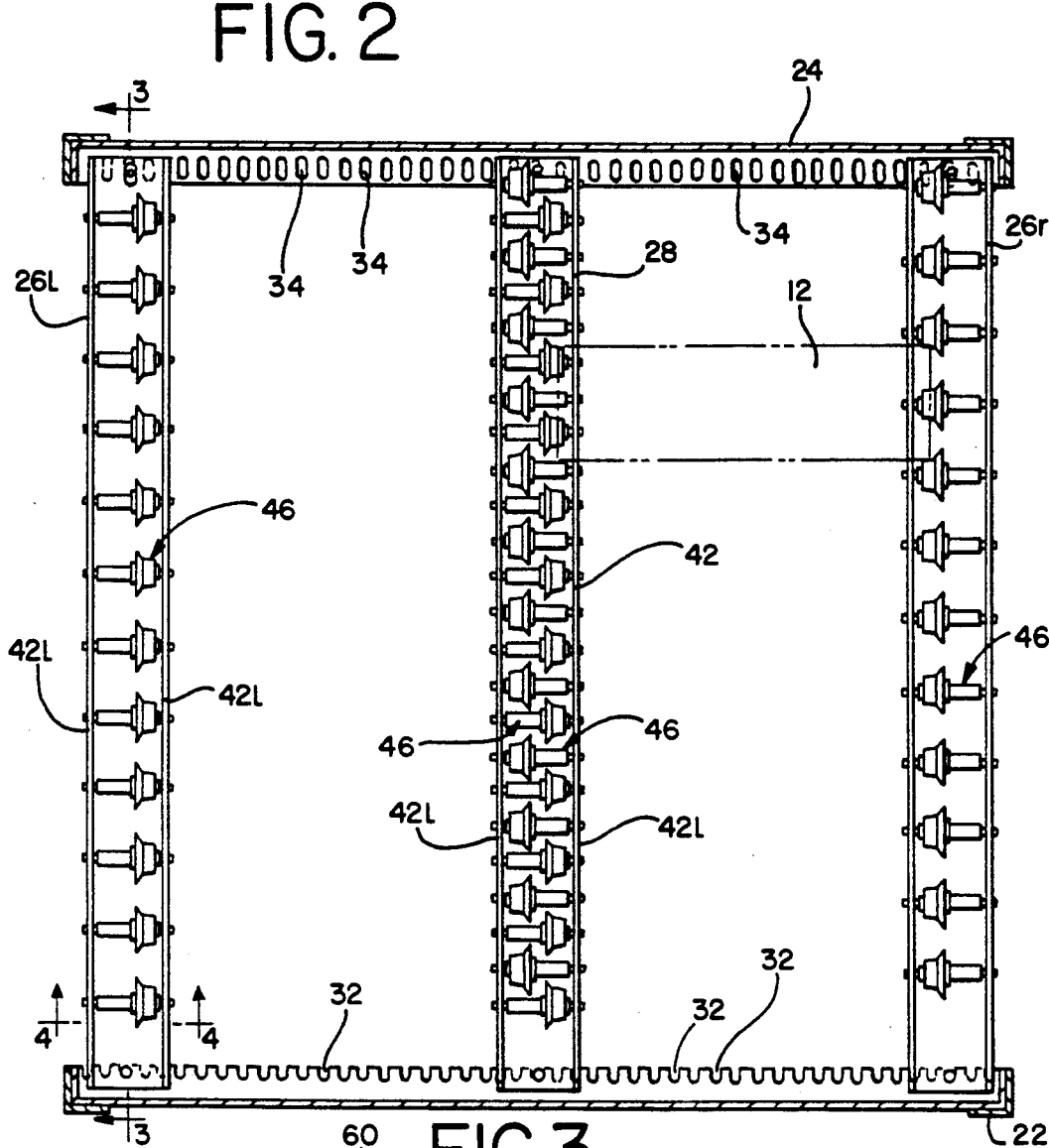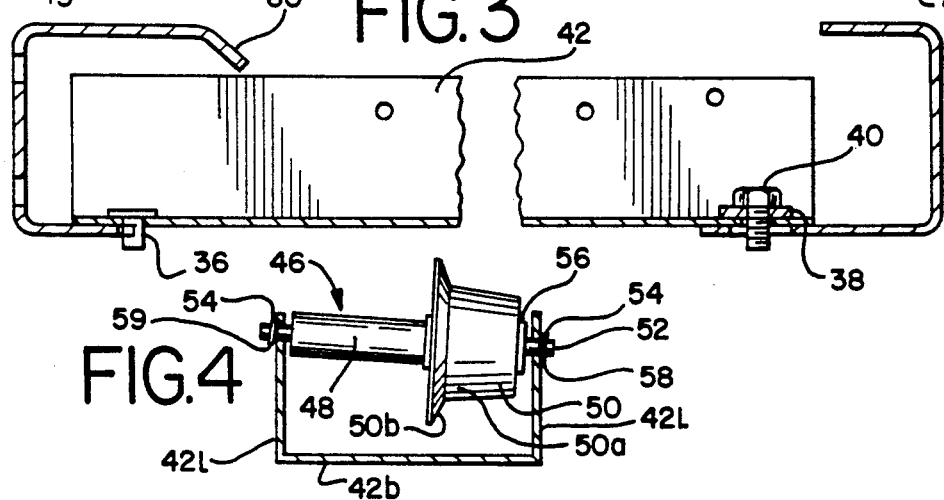

MERCHANDISING SYSTEM

This is a continuation of copending U.S. patent application Ser. No. 07/742,915, filed on Aug. 9, 1991, now abandoned.

TECHNICAL FIELD

The invention relates to a system for merchandising product, and more particularly to a system for merchandising automotive batteries and the like.

BACKGROUND PRIOR ART

Systems for merchandising a plurality of product, such as batteries for automobiles, motorcycles, and the like, are well known.

Typically such systems comprised a frame supporting a plurality of corresponding front and rear cross-members, spaced one above another. Pairs of horizontally spaced angle brackets, having facing horizontal legs, opposed vertical legs and a plurality of cylindrical rollers, extend between corresponding ones of the front and rear crossmembers and were secured thereto, as by bolting. Support strips often also extended between correponding ones of the front and rear cross-members. Each of the angle bracket pair defined a guide to deliver product loaded from the rear of the system to the front of the system. If the angle brackets were properly spaced, the product would roll to the front of the system on the rollers. However, as was often the case due to the difficulty of unbolting and moving the angle brackets, the angle brackets were not properly spaced, so that the product was not properly carried by the rollers. Rather, often the product was carried by the support strips. Additionally, as two angle brackets were required for each row of the product, many angle brackets were required for each system.

The present invention is provided to solve these and other problems.

SUMMARY OF THE INVENTION

It is an object of the invention to provide a system for merchandising a plurality of discrete products, such a vehicular batteries.

In accordance with the invention, the system comprises a frame having a front and rear support assembly, a front cross-member and a rear cross-member. An outer pair of spaced, inwardly tapered, parallel roller tracks is provided. Each of the outer pair of roller tracks extend between the front cross-member and the rear cross member. A plurality of bi-directionally tapering roller tracks are disposed in parallel between the outer pair of roller tracks and extend between the front cross-member and the rear cross-member. Each of the roller tracks cooperate with an adjacent one of the roller tracks to form a generally V-shaped guide for centering and sequentially delivering product loaded from the rear of the system to the front.

The system further includes means for laterally adjusting the bi-directionally tapering roller tracks to selectably adjust the width of each of the guides. Specifically, a plurality of notches are disposed along the front cross-member and a corresponding plurality of slots are disposed along the rear cross-member. Each of the bi-directionally tapering roller tracks includes a downwardly extending pin for engagement with one of the notches and a nut adapted for receiving a bolt extending through the corresponding one of the slots.

Other features and advantages of the invention will be apparent from the following specification taken in conjunction with the following drawings.

BRIEF DESCRIPTION OF DRAWINGS

FIG. 2 is a plan view of a typical one of the shelves in/the system of FIG. 1;

FIG. 3 is a sectional view taken along line 3—3 of FIG. 2;

FIGS. 4 is a sectional view taken along line 4—4 of FIG. 2;

DETAILED DESCRIPTION

Figure 1:
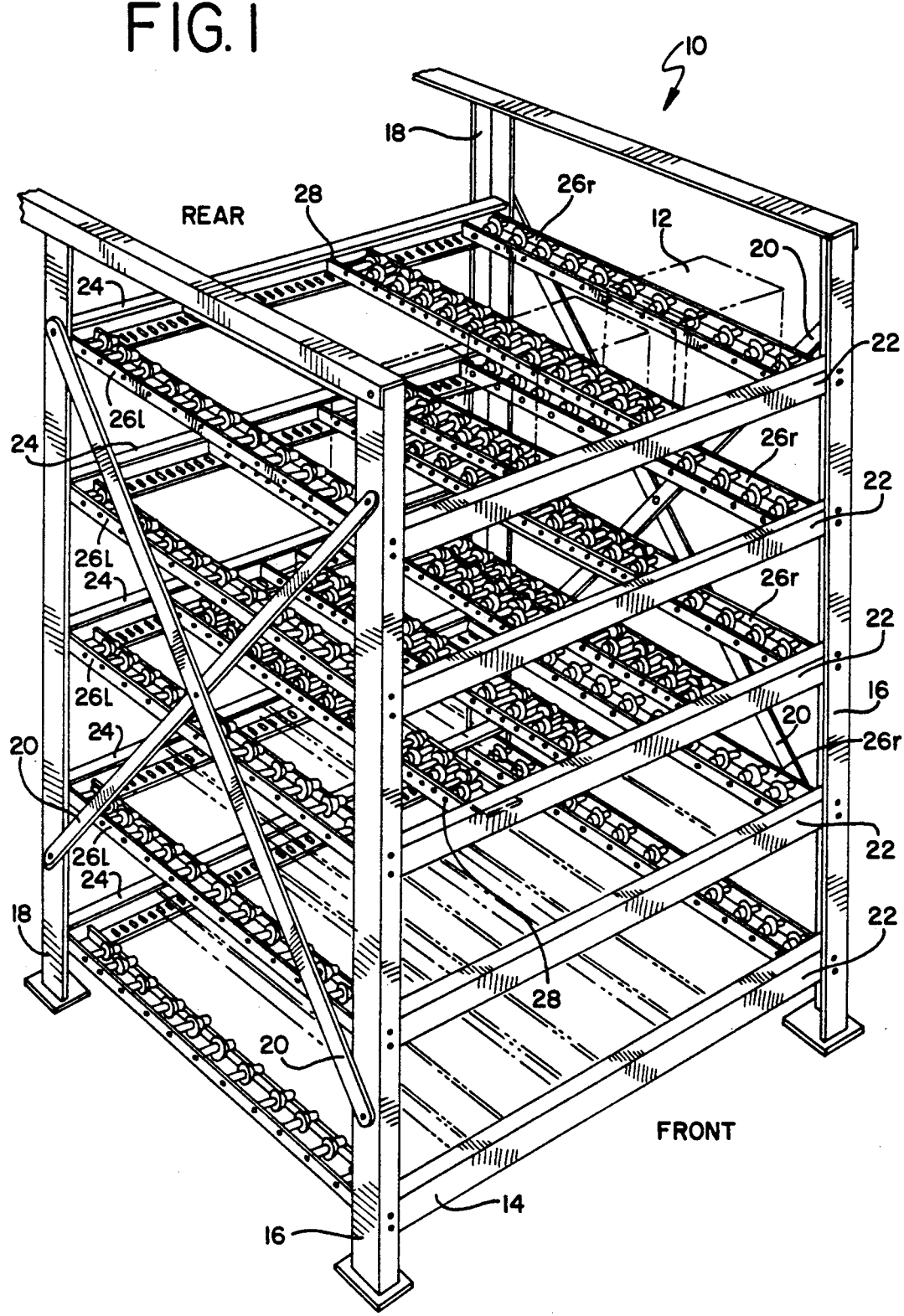
FIG. 1 is a perspective view of a merchandising system according to the invention having a plurality of shelves.
Figure 5:
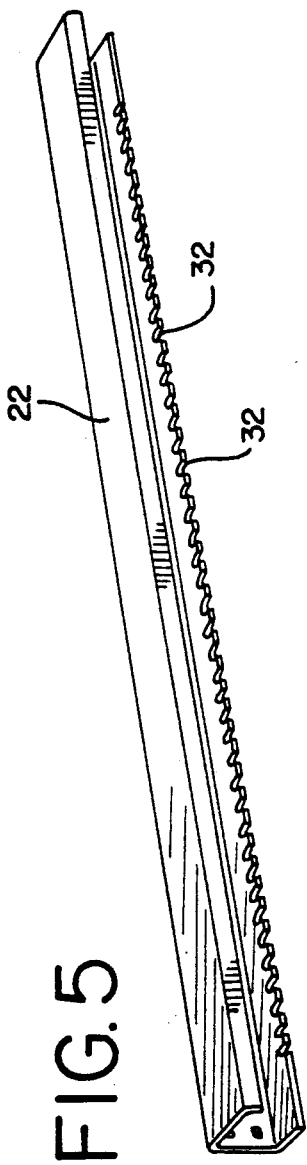
FIG. 5 is a perspective view of a front cross-member a utilized in the system of FIG. 1.
Figure 6:
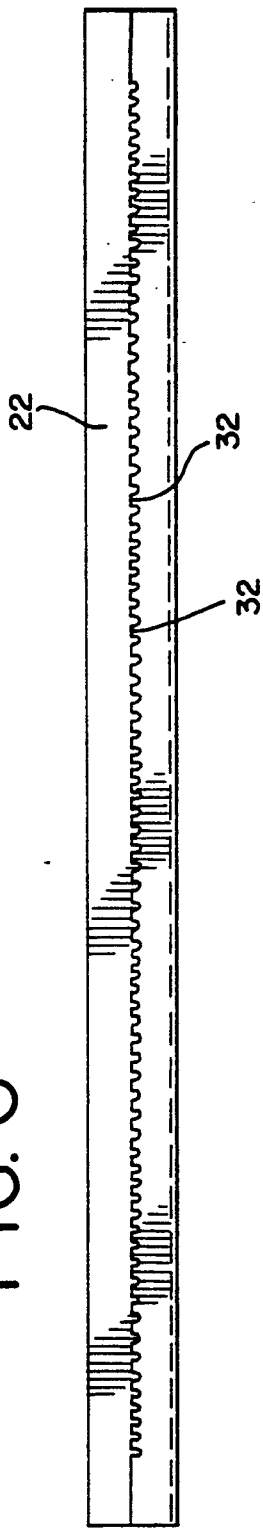
FIG. 6 is a bottom view of the front cross-member of FIG. 5.
Figure 7:
FIG. 7 is a bottom view of the front cross-member of FIG. 5.
Figure 8:
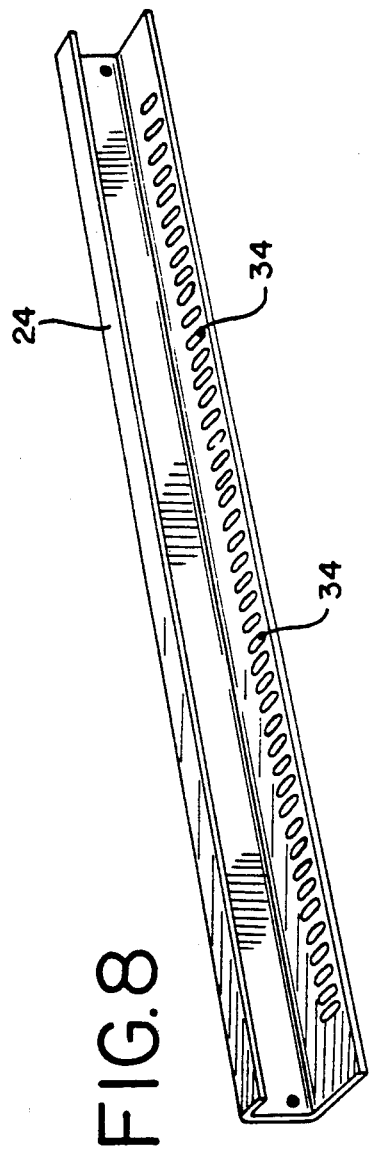
FIG. 8 is a perspective view of a rear cross-member as utilized in the system of FIG. 1.
Figure 9:
FIG. 9 is a bottom view of the rear cross-member of FIG. 8.
Figure 10:
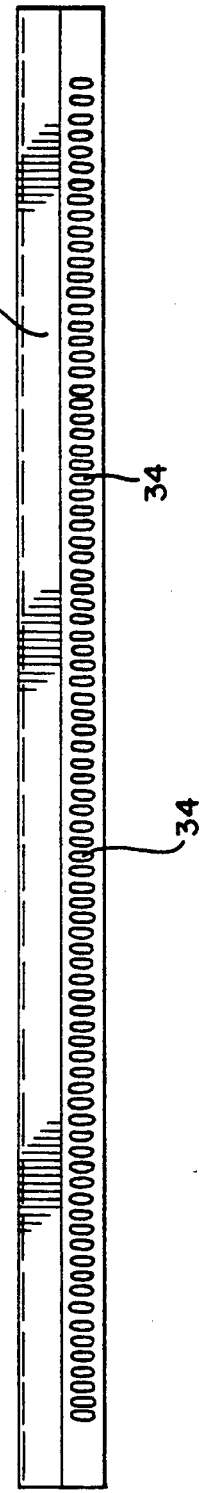
FIG. 10 is a bottom view of the rear cross-member of FIG. 8.

While this invention is susceptible of embodiments in many different forms, there is shown in the drawings and will herein be described in detail, a preferred embodiment of the invention with the understanding that the present disclosure is to be considered as an exemplification of the principles of the invention and is not intended to limit the broad aspects of the invention to the embodiment illustrated.

A system, generally designated 10, for merchandising a plurality of discrete products, such as vehicular batteries 12, is illustrated in FIG. 1. As discussed below, batteries are loaded on the system 10 from the rear, and are gravity fed towards the front, where a consumer would remove the battery for purchase. The system could be used to merchandise other product without departing from the spirit and scope of the invention.

The system 10 comprises a frame 14 comprising a front support assembly of a pair of front legs 16 and a rear support assembly of a pair of rear legs 18. The front and rear legs 16, 18 are formed of ⅛" thick steel angle iron and are tied together by 1/16" thick x 1" wide steel cross-bracing 20.

The system 10 further includes five, parallel front cross-members 22 and a respective five rear cross-member 24. The cross-members 22, 24 are formed of ⅛" steel. The particular number of cross-members 22, 24 can vary, depending on the quantity of product to be merchandised.

A left and right, outer pair of spaced, inwardly tapered, roller tracks, 26l, 26r, respectively, are associated with each corresponding pair of cross-members 22, 24, and extend therebetween. A plurality of a bi-directionally tapering roller track 28 are disposed between the outer pair of roller tracks 26l, 26r and extend between respective ones of the front cross-member 22 and the rear cross-member 24. The bi-directional roller tracks 28 operate to guide ones of the batteries 12 on either side thereof. The tracks are disposed at a downward angle of 20° to the horizontal to provide the gravity feed.

As illustrated in FIGS. 2 and 3, in order to accommodate batteries 12 of various widths, means are provided for easily laterally adjusting the positions of the bi-directional tracks 28 on the front and rear cross-members 22, 24. Specifically, a plurality of notches 32 are disposed along the front cross-member and a corresponding plurality of slots 34 are disposed along the rear cross-member. The outer roller tracks 26l, 26r and the directionally tapering roller tracks 28 include a downwardly extending pin 36 for engagement with one of the notches 32 and also include a nut 38 adapted for receiving a bolt 40 extending through the corresponding one of the slots 34. Thus to laterally move one of the outer roller tracks 26l, 26r or the directionally tapering roller tracks 28, one simply removes the single bolt 40, moves the particular track to the proper pair of notches 32 and slots 34, and reinserts the bolt 40.

As illustrated in FIGS. 3 and 4, the tapered roller tracks 26l, 26r and 28 are formed of a U-shaped ¼" thick channel 42 having a 3" wide base 42b and opposing, upwardly directed 1⅛" legs 42l. The outer roller tracks 26l, 26r, each have a plurality of tapered roller assemblies 46, each facing in the same direction on 3" centers. The bi-directional roller tracks 28 have alternately facing tapered roller assemblies 46 on 1.5" centers. Thus the like-directed roller assemblies 46 of the bi-directional roller tracks 28 are on 3" centers to conform with the spacing of the roller assemblies 46 of the outer roller tracks 26l, 26r.

Referring to FIG. 4, the tapered roller assemblies 46 comprise a plastic spacer 48 and a plastic roller 50. A 3/16" diameter steel roller pin 52 rotatably extends through the plastic spacer 48 and the plastic roller 50. C-clip springs 54 and a washer 56 secure the roller pin 52 in the channel 42.

Each of the rollers 50 has a first portion 50a tapering at a first angle of 5° and a second portion operating as a bumper 50b tapering at a substantially greater angle. The roller pins 52 themselves are disposed at a non-zero angle relative to the horizontal, as the spacer end of the roller pin is inserted in a hole 58 which is ¼" from the top of the channel leg 42l, while the roller end thereof is inserted in a hole 59 which is ⅜" from the top of the channel leg 42l. Adjacent ones of the tracks cooperate to form a V-shaped guide to deliver product from the rear of the system 10 to the front thereof. The downward angle of the roller pins 52, in conjunction with the tapering of the rollers 50, cooperate to center the batteries as they are delivered.

For protection against battery acid corrosion, the tracks are coated with an acid resistant coating, such as epoxy base powder coat. The front cross-members 22 are covered by a PVC vinyl extrusion. As illustrated in FIG. 3, the front cross members 22 include a sloping surface 60 which provides a rest stop for the gravity feed of the product, as well as to provide a removal slope to assist a consumer to remove a battery 12 from the system 10.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A system for merchandising a plurality of discrete products, the system comprising:

a frame comprising a front and rear support assembly;
   a front cross-member;
   a rear cross-member;
   a first outer track and a second outer track, said tracks including a plurality of rollers having a first tapered support portion and a second tapered bumper portion tapering at a greater angle than said first portion wherein said first portion defines a frustoconical shape to help center said products, each of the outer tracks extending between the front cross-member and the rear cross-member; and
   a bi-directional track including a plurality of rollers having a first tapered support portion and a second tapered bumper portion tapering at a greater angle than said first portion wherein said support portion is inclined toward said first outer track and a plurality of rollers having a first tapered support portion and a second tapered bumper portion tapering at a greater angle than said first portion wherein said support portion is inclined toward said second outer track, said bi-directional track disposed between the outer roller tracks and extending between the front cross-member and the rear cross-member.

2. The merchandising system of claim 1 including means for laterally adjusting the bi-directionally tapering roller track.

3. The merchandising system of claim 2 wherein the laterally adjusting means comprises:

a plurality of notches disposed along one of the front or rear cross-member;
   a corresponding plurality of slots disposed along the other of the front or rear cross-member;
   wherein the bi-directional track includes a downwardly extending pin for engagement with one of the notches and a nut adapted for receiving a bolt extending through the corresponding one of the slots.

4. The merchandising system of claim 3 wherein the plurality of notches are disposed along the front cross-member and the plurality of slots are disposed along the rear cross-member.

5. The merchandising system of claim 1 including a plurality of bi-directional tracks, each disposed between the outer tracks and extending between the front cross-member and the rear cross-member.

6. The merchandising system of claim 5 including means for laterally adjusting each of the plurality of bidirectional tracks.

7. The merchandising system of claim 6 wherein the laterally adjusting means comprises:

a plurality of notches disposed along one of the front or rear cross-member;
   a corresponding plurality of slots disposed along the other of the front or rear cross-member;
   wherein each bidirectional track includes a downwardly extending pin for engagement with one of the notches and a nut adapted for receiving a bolt extending through the corresponding one of the slots.

8. The merchandising system of claim 7 wherein the plurality of notches are disposed along the front cross-member and the plurality of slots are disposed along the rear cross-member.

9. The merchandising system of claim 1 wherein each of the tracks comprises a U-shaped channel having a base and opposing, upwardly directed legs, and a plurality of tapered roller assemblies, each extending between the opposing legs.

10. The merchandising system of claim 9 wherein each of the tapered roller assemblies comprises:
   a plastic spacer;
   a plastic roller; and
   a roller pin extending between the plastic spacer and the plastic roller.

11. The merchandising system of claim 10 wherein each of the rollers has a first portion tapering at a first angle and a second portion tapering at a second, different angle.

12. The merchandising system of claim 10 wherein the roller pin is disposed at a non-zero angle relative to the horizontal.

13. The system of claim 1 wherein said plurality of rollers having first portions inclined toward said first outer track and said plurality of rollers having first portions inclined toward said second outer track are alternately arranged on said bi-directional track.

14. A system for merchandising a plurality of discrete products, the system comprising:
   a frame comprising a front and rear support assembly;
   a front cross-member;
   a rear cross-member;
   a first outer track and a second outer track, said tracks including a plurality of rollers having a first tapered support portion and a second tapered bumper portion tapering at a greater angle than said first portion wherein said first portion defines a frustoconical shape to help center said products, each of the outer tracks extending between the front cross-member and the rear cross member;
   a plurality of bi-directional tracks, each of said bi-directional tracks including a plurality of rollers having a first tapered support portion and a second tapered bumper portion tapering at a greater angle than said first portion wherein said support portion is inclined toward said first outer track and a plurality of rollers having a first tapered support portion is and a second tapered bumper portion tapering at a greater angle than said first portion wherein said support portion is inclined toward said second outer track, said bi-directional tracks disposed in parallel between the first and second outer tracks and extending between the front cross-member and the rear cross-member, each of the tracks cooperating with an adjacent one of the tracks to form a guide for sequentially delivering product; and
   means for laterally adjusting the bi-directional tracks to selectably adjust the width of each of the guides.

15. The merchandising system of claim 14 wherein the laterally adjusting means comprises:
   a plurality of notches disposed along one of the front or rear cross-member;
   a corresponding plurality of slots disposed along the other of the front or rear cross-member;
wherein each of the bi-directionally tapering roller tracks includes a downwardly extending pin for engagement with one of the notches and a nut adapted for receiving a bolt extending through the corresponding one of the slots.

16. The merchandising system of claim 15 wherein the plurality of notches are disposed along the front cross-member and the plurality of slots are disposed along the rear cross-member.

17. The system of claim 14 wherein said plurality of rollers having first portions inclined toward said first outer track and said plurality of rollers having first portions inclined toward said second outer track are alternately arranged on said bi-directional track.

18. A system for merchandising a plurality of discrete products, the system comprising:
   a frame comprising a front and rear support assembly;
   a front cross-member;
   a rear cross-member;
   a first outer track and a second outer track, said tracks including a plurality of rollers having a first tapered support portion and a second tapered bumper portion tapering at a greater angle than said first portion wherein said first portion defines a frustoconical shape to help center said products, each of the outer tracks extending between the front cross-member and the rear cross member;
   a plurality of bi-directional tracks, each bi-directional track including a plurality of rollers having a first tapered support portion and a second tapered bumper portion tapering at a greater angle than said first portion wherein said support portion is inclined toward said first outer track and a plurality of rollers having a first tapered support portion and a second tapered bumper portion tapering at a greater angle than said first portion wherein said support portion is inclined toward said second outer track, said bi-directional tracks disposed in parallel between the outer tracks and extending between the front cross-member and the rear cross-member, each of the tracks cooperating with an adjacent one of the tracks to form a generally V-shaped guide for sequentially delivering product; and
   means for laterally adjusting the bi-directional tracks to selectably adjust the width of each of the guides.

19. The merchandising system of claim 18 wherein the laterally adjusting means comprises:
   a plurality of notches disposed along one of the front or rear cross-member;
   a corresponding plurality of slots disposed along the other of the front or rear cross-member; wherein each of the bi-directional tracks includes a downwardly extending pin for engagement with one of the notches and a nut adapted for receiving a bolt extending through the corresponding one of the slots.

20. The system of claim 18 wherein said plurality of rollers having first portions inclined toward said first outer track and said plurality of rollers having first portions inclined toward said second outer track are alternately arranged on said bidirectional track.

21. A system for merchandising a plurality of discrete products, the system comprising:
   a frame comprising a front and rear support assembly;
   a front cross-member;
   a rear cross-member;
   a first outer track and a second outer track, said first outer track having a plurality of rollers having a first tapered support portion and a second tapered bumper portion tapering at a greater angle than said first portion wherein said support portion is inclined toward said second outer track and said second outer track having a plurality of rollers having a first tapered support portion and a second tapered bumper portion tapering at a greater angle than said first portion wherein said support portion is inclined toward said second outer track, said first portions of said rollers define a frustoconical shape to help center said products.

22. The system of claim 21 wherein an axis of said roller is disposed at a non-zero angle relative to a horizontal plane.

23. A system of merchandising a plurality of discrete products, the system comprising:
- a frame comprising a front and a rear support assembly;
- a front cross-member;
- a rear cross-member;
- a first outer track and a second outer track, said first and second outer tracks extending between said front cross-member and said rear cross-member, said first and second outer tacks including a plurality of rollers wherein said rollers include a cylindrical support surface having an axis of rotation disposed at an angle relative to a horizontal plane; and
- a bi-directional track disposed between said first and second outer tracks and extending between said front and rear cross-members, said bi-directional track having a plurality of rollers wherein said rollers have a cylindrical support surface having an axis of rotation disposed at an angle relative to the horizontal plane.

24. The system of claim 23 including a plurality of bi-directional tracks disposed between said first and second outer tracks and extending from said front and rear cross-members.

* * * * *